United States Patent [19]

Sakamoto

[11] Patent Number: 4,631,672
[45] Date of Patent: Dec. 23, 1986

[54] ARITHMETIC CONTROL APPARATUS FOR A PIPELINE PROCESSING SYSTEM

[75] Inventor: Tsutomu Sakamoto, Tokyo, Japan

[73] Assignee: Tokyo Shibaura Denki Kabushiki Kaisha, Kawasaki, Japan

[21] Appl. No.: 459,989

[22] Filed: Jan. 21, 1983

[30] Foreign Application Priority Data

Jan. 27, 1982 [JP] Japan .................................. 57-11121

[51] Int. Cl.[4] .............................................. G06F 7/00
[52] U.S. Cl. .................................................. 364/200
[58] Field of Search ................................ 364/200, 900

[56] References Cited

U.S. PATENT DOCUMENTS

| | | | |
|---|---|---|---|
| 3,840,861 | 10/1974 | Amdahl et al. | 364/200 |
| 3,875,391 | 4/1975 | Shapiro et al. | 364/200 |
| 4,305,124 | 12/1981 | Marro et al. | 364/200 |
| 4,345,309 | 8/1982 | Arupragasam et al. | 364/200 |
| 4,346,435 | 8/1982 | Wise | 364/200 |
| 4,373,180 | 2/1983 | Linde | 364/200 |
| 4,390,946 | 6/1983 | Lane | 364/200 |
| 4,399,507 | 8/1983 | Cosgrove et al. | 364/200 |
| 4,454,578 | 6/1984 | Matsumoto et al. | 364/200 |

*Primary Examiner*—Eddie P. Chan
*Attorney, Agent, or Firm*—Kenyon & Kenyon

[57] ABSTRACT

A microprogram-controlled type arithmetic control apparatus which performs pipeline processing is provided. In the apparatus, a microinstruction corresponding to a macroinstruction to be processed are read out of a control storage at least one stage prior to an OF (operand fetch) stage. The microinstruction and data (source data) are respectively output onto a microinstruction bus and a data bus at the OF stage. By the beginning of an E (instruction execution) stage, data (source data) on the data bus and the microinstruction on the microinstruction bus are loaded into first and second registers, respectively. Then, at the beginning of the E stage, arithmetic operation by an arithmetic and logic unit can be performed immediately.

9 Claims, 3 Drawing Figures

F I G. 2
| 0 | 1 | 2 | | 8 | 9 | | 13 | 14 | | 18 | 19 | | 22 | 23 | | | 31 |
|---|---|---|---|---|---|---|----|----|---|----|----|---|----|----|---|---|----|
| T | | F | | | D | | | B | | | A | | | X | | | |
F I G. 3
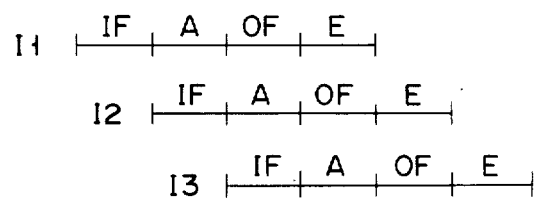

ARITHMETIC CONTROL APPARATUS FOR A PIPELINE PROCESSING SYSTEM

BACKGROUND OF THE INVENTION

The present invention relates to a microprogram-controlled type arithmetic control apparatus utilized in a pipeline processing system.

An advanced approach to improving the speed at which computers can process instructions has been the development of the pipelined processor. These processors can perform many instructions at very high speeds because the internal organization has been designed so as to optimize the number of instructions that can be performed over a period of time. A pipelined processor actually performs certain operations on several different instructions simultaneously. For example, one instruction might call for an operation upon two operands contained within the main memory. These operands might be fetched from main memory during the same period of time that a second instruction was being decoded to determine its type as well as its data requirements. Still a third instruction might be nearing its completion, all in the same machine cycle. Such a pipeline processing unit is disclosed in U.S. Pat. No. 3,771,138 and in U.S. Pat. No. 3,840,861, for example. Therefore, its actual hardware construction is omitted.

At an execution stage of an instruction in a prior art pipeline processing unit, a microinstruction which controls the execution stage is read out of a control memory onto a microinstruction bus. In accordance with the microinstruction, a source data to be input to an arithmetic circuit is read out from a general register, a memory data register or a working register. An arithmetic operation is performed in the arithmetic circuit in accordance with the microinstruction. The result of the arithmetic operation is stored in a general register designated by the microinstruction.

As described above, the execution stage of the instruction necessitates a long processing time from the start to the end of the stage. Thus the processing time for other stages such as a fetch stage, operand address calculation stage and operand read stage should be set in accordance with the execution stage thereby obstructing the improved processing speed of the instruction.

SUMMARY OF THE INVENTION

The present invention has been intended in view of the above drawbacks, and its object is to provide an arithmetic control apparatus in which execution time of the E stage (instruction execution stage) can be reduced so that execution times of other stages can be reduced, thereby highly improving the processing speed of an instruction.

The pipeline processing system, with which the present arithmetic control apparatus is utilized, includes an instruction register for loading with an instruction at the end of an instruction fetch stage, and possesses an operand address computation stage, an operand fetch stage, and an instruction execution stage. The arithmetic control apparatus of the present invention comprises means, adapted to be coupled to the instruction register, for storing microinstructions, and for outputting, during the operand fetch stage, a microinstruction corresponding to the instruction loaded into the instruction register at the end of the instruction fetch stage. The apparatus further includes means, coupled to the microinstruction storing and outputting means, for storing operands, and for outputting operands during the operand fetch stage in accordance with the microinstructions. Arithmetic and logic means, coupled to the microinstruction storing and outputting means, and to the operand storing and outputting means, is utilized for storing the operands output by the operand storing and outputting means, for performing, during the instruction execution stage, an arithmetic operation upon the operands in accordance with the microinstruction, and for outputting a result of the arithmetic operation.

In a preferred embodiment of the present invention, the operand storing and outputting means is coupled to the arithmetic and logic means by a first and a second data bus. The operand storing and outputting means includes group register means, adapted to be coupled to the instruction register, for storing operands, and for outputting, during the operand address computation stage, at least one operand in accordance with the instruction loaded in the instruction register at the end of the instruction fetch stage; and, includes first register means, coupled to the group register means, the microinstruction storing and outputting means, and the first and second data busses, for storing at the end of the operand address computation stage the output of the group register means, and for outputting the stored operands during the operand fetch stage in accordance with the microinstruction. The operand storing and outputting means also includes main memory means for storing operands, and for outputting, during the operand fetch stage, a main memory operand corresponding to an address computed during the operand address computation stage; and main memory register means, coupled to the main memory, the microinstruction storing and outputting means, and the second data bus, for storing, during the operand fetch stage, the main memory operand, and for outputting the main memory operand during the operand fetch stage in accordance with the microinstruction. In this preferred embodiment the operand storing and outputting means further includes working register means, coupled to the microinstruction storing and outputting means, and to the first and second data busses, for receiving and storing operands, and for outputting operands, during the operand fetch stage, in accordance with the microinstruction. The microinstruction is designed so that during the operand fetch stage only a single operand is output onto the first data bus, and only a single operand is output onto the second data bus. The microinstruction storing and outputting means, in this preferred embodiment, includes control storage means, adapted to be coupled to the instruction register, for storing the microinstructions, and for outputting, during the operand address computation stage, the microinstruction corresponding to the instruction loaded in the instruction register at the end of the instruction fetch stage; and, also includes microinstruction register means, coupled to the control storage means, the first register means, the working register means, the main memory register means, and the arithmetic and logic means, for storing, at the end of the operand address computation stage, the microinstruction, and for outputting the microinstruction during the operand fetch stage. In this preferred embodiment, the arithmetic and logic means includes second register means, coupled to the second data bus, for storing, at the end of the operand fetch stage, a first operand received from the second data bus, and for outputting the first operand during the instruction execution stage; third register means, coupled to the first data bus, for storing at the end of the operand fetch stage, a second operand received from the first data bus, and for outputting the second operand during the instruction execution stage; and fourth register means, coupled to the microinstruction register means, for storing, at the end of the operation fetch stage, the microinstruction, and for outputting the microinstruction during the instruction execution stage. The arithmetic and logic means further includes means, coupled to the second, third, and fourth register means, for performing, during the instruction execution stage, the arithmetic operation upon the first and second operands in accordance with the microinstruction, and for outputting the result.

BRIEF DESCRIPTION OF THE DRAWINGS

Other objects and features of the present invention will be apparent from the following description taken in connection with the accompanying drawings, in which:

FIG. 2 is a view showing a format of a microinstruction; and

FIG. 3 is a view showing timing charts of pipeline processing.

DETAILED DESCRIPTION OF THE PREFERRED EMBODIMENT

Figure 1:
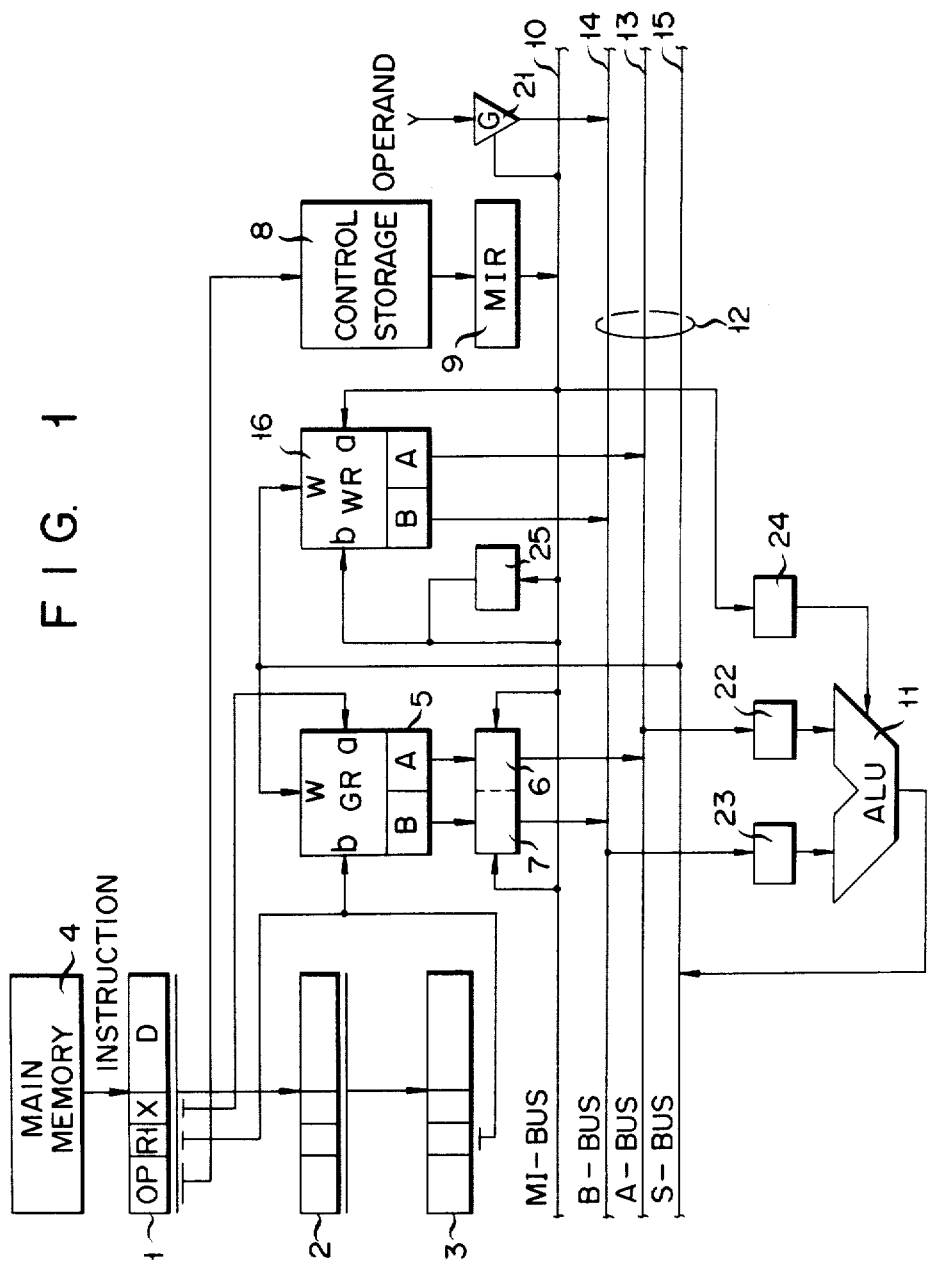
FIG. 1 is a block diagram showing an embodiment of the present invention.

FIG. 1 shows a block diagram of an embodiment of the present invention. In the figure, an instruction read out of a main memory 4 is loaded into an instruction register 1 at the end of an instruction fetch stage (hereinafter referred to as IF stage). The instruction in the instruction register 1 is then loaded into an instruction register 2 at the end of an operand address computation stage (hereinafter referred to as A stage). Furthermore, the instruction in the register 2 is loaded in a register 3 at the end of an operand fetch stage (hereinafter referred to as OF stage). As described above, an instruction read out of the main memory is sequentially loaded into the registers 1 through 3 at each stage of the pipeline processing.

In the embodiment of FIG. 1, the pipeline processing comprises four stages, namely the IF stage, the A stage, the OF stage and an instruction execution stage (hereinafter referred to as E stage). FIG. 3 shows timing charts of the pipeline processing wherein instructions I1 through I3 are executed. Depending on instructions, such cases exists that the A stage and the OF stage are not necessary, or the E stage is extended. Furthermore, the instruction is of an RX type and comprises, as shown in the instruction register 1, an operation code (OP), a first operand register address (R1) and a second operand address comprising an index register address (X) and a displacement D. When the instruction is of an RR type, a second operand register address (R2) is substituted for the index register address (X). The operation code (OP) in the instruction register 1 is connected to be supplied to a control storage 8. The control storage 8 stores microinstructions corresponding to a user instruction (or a macroinstruction). A format of the microinstruction is shown in FIG. 2. In the figure, T field designates a type of instruction and F field designates an arithmtic operation mode of an arithmetic and logic unit 11 to be described later.

When a plurality of arithmetic and logic units are connected to the MI-bus 10, a part of the F field is used as a selection data for appointing one of the arithmetic and logic units. D field designates a desitination register and B and A fields designate source registers from which data are output onto the B-bus 14 and the A-bus 13, respectively. According to the type of the instruction designated by the T field, the format of FIG. 2 differs partially. However, it is not pertinent to the present invention, therefore the description thereof will be omitted.

The instruction from the control storage is output onto a microinstruction bus 10 (hereinafter referred to as MI-bus) through a macroinstruction register 9 (hereinafter referred to as MIR). Furthermore, the index register address (X) and the first operand register address (R1) are connected to be supplied to address inputs a and b of a general register set 5 (hereinafter referred to as GR), respectively. The GR 5 is a group of registers which are used as operand registers, index registers and accumulators. The GR 5 comprises two ports A and B which have the inputs a and b, respectively. Further, the GR 5 has a write data input w which is connected to a S-bus 15 to receive data therefrom. The data from the ports A and B are output onto an A-bus 13 and a B-bus 14 within a data bus 12 through registers 6 and 7, respectively. The registers 6 and 7 are also connected to the MI-bus 10 to receive decoded signals of the A field and the B field of a microinstruction on the MI-bus 10. To the input b of the GR 5 connected is the first operand register address (R1) of the instruction register 3. To the A-bus 13 and the B-bus 14 connected are registers 22 and 23. In the registers 22 and 23 loaded are data (source data) on the A-bus 13 and the B-bus 14 at the completion of the OF stage. (The loading may be performed at the beginning of the E stage.) The data from the registers 22 and 23 are supplied to an arithmetic and logic unit 11 (hereinafter referred to as ALU). Further, to the ALU 11 connected is an output of a register 24. The register 24 is connected to the MI-bus 10 to hold a microinstruction from the MIR 10 at the completion of the OF stage. (It may be loaded by the beginning of the E stage). The ALU 11 performs arithmetic operation on data (source data) in the registers 22 and 23 in accordance with the type of the arithmetic operation being designated by the F field of the microinstruction and feeds the result onto the S-bus 15 of the data bus 12. The data (source data) on which the arithmetic operation is performed by the ALU 11 are supplied from an output gate 21 to be described later, the registers 6 and 7 and the working register 16 (hereinafter referred to as WR).

The access method of the WR 16 are different from that of the GR 5. The data stored in the WR 16 are read out by the designation of the microinstruction on the MI-bus 10 and are output onto the A-bus 13 and the B-bus 14. The WR 16 has the same construction as the GR 5. That is, the contents of the A field and the B field of the microinstruction are input to the address inputs a and b as addresses. Thus, the contents of the register designated by the address are output from the ports A and B of the WR 16. Further, a register 25 is connected between the MI-bus 10 and the b input of the WR 16. The register 25 holds the contents of the D field of the microinstruction on the MI-bus 10 at the end of the OF stage. The contents of the register 25 are supplied to the b input of the WR 16 as write address. Further, the WR 16 has a write data input w which is connected to the S-bus 15 to receive data therefrom.

An output gate 21 (hereinafter referred to as G) feeds the operand read out of the main memory at the OF stage onto the B-bus 14 in accordance with the microinstruction on the MI-bus 10.

In this embodiment, the operation code (OP), the register address (R1) and the index address X (R2) of the macroinstruction stored in the instruction register 1 are supplied to the control storage 8 and the GR 5 as read addresses. That is, as the prior art the GR 5 and the control storage 8 are accessed at the OF stage. In the embodiment of the present invention, the GR 5 and the control storage 8 are accessed at the A stage which is the previous stage of the OF stage.

Now the operation of the embodiment will be described. At the IF stage, the instruction I1 read out from the main memory is loaded in the instruction register 1 at the end of the IF stage. Then the A stage is executed to compute the operand address of the instruction I1. Furthermore, the operation code (OP) of the instruction I1 loaded in the instruction register 1 is fed to the control storage 8 as a read address of the corresponding microinstruction. Therefore, the microinstruction corresponding to the instruction I1 is read out from the control storage 8. The microinstruction is loaded in the MIR 9 at the end of the A stage. Furthermore, R1 (R1 and R2 in case of the RR type) of the instruction I1 loaded in the instruction register 1 is fed to the GR 5 as the b address (b address and a address in case of the RR type). As a result, the first operand (the first and the second operand in case of RR type) is read out from the port B (the port B and the port A in case of the RR type) of the GR 5. The first operand (the first operand and second operand in case of the RR type) is loaded in the register 7 (in the registers 7 and 6 in case of the RR type) at the end of the A stage. As described above, the microinstruction read out from the control storage device 8 and further the data from the GR 5 are loaded in the MIR 9 and the registers 6 and 7, respectively. (In the prior art, the above described microinstruction and the data are loaded at the end of the OF stage.)

The instruction (I1) loaded in the instruction register 1 is loaded in the instruction register 2 at the end of the A stage which corresponds to the instruction (I1). Then the OF stage is executed. At the OF stage, the main memory is accessed with the operand address computed at the A stage to read the operand (the second operand address). The operand read out from the main memory is input to the G 21. Apparently, in this OF stage the microinstruction instruction which is loaded in the MIR 9 at the end of the A stage is output onto the MI-bus 10.

The microinstruction is designed so that only a single selected operand is output onto the A-bus 13 during the operand fetch stage, and so that only a single selected operand is output onto the B-bus 14 during the operand fetch stage. Accordingly, when the microinstruction is output onto the MI-bus 10 during the operand fetch output stage, either the operand in the G 21 is output onto the B-bus 14 in response to a decoded signal of the microinstruction, or the operand in the register 7 is output onto the B-bus 14, or in response to the contents of the B field of the microinstruction being fed as a "b" address to the WR 16 an operand from the WR 16 is output onto the B-bus 14. That is, only one operand is output onto the B-bus 14, depending upon the selection of the microinstruction. Similarly, either the operand in the register 6 is output onto the A-bus 13 in response to the microinstruction, or in response to the contents of the A field of the microinstruction fed to the WR 16 as an "a" address, an operand is output from the WR 16 to the A-bus 13. Only one operand is output onto A-bus 13, depending upon the selection of the microinstruction. According to the embodiment of the present invention, the microinstruction which corresponds to the instruction to be processed and which is used at the E stage, and the source data are output onto the MI-bus 10, A-bus 13 and B-bus 14 (data bus), respectively during the OF stage. The microinstruction on the MI-bus 10 is loaded in the register 24 at the end of the OF stage. Data (source data) on the A-bus 13 and the B-bus 14 are loaded in the registers 22 and 23 at the end of the OF stage. Simultaneously, the contents of the D field of the microinstruction on the MI-bus 10 are loaded in the register 25. Furthermore, the instruction (I1) loaded in the instruction register 2 is transferred to the instruction register 3 at the end of the OF stage. At this time, the next instruction I2 succeeding to the instruction I1 is already stored in the instruction register 1. The instruction I2 is then transferred to the instruction register 2 when the instruction I1 is transferred to the instruction register 3.

When the OF stage for the instruction I1 (or the A stage for the instruction I2) is completed, E stage for the instruction I1 (or the OF stage for the instruction I2) is executed. In this embodiment, the microinstruction and the source data used at the E stage are loaded in the registers 22 through 24 by the time to start executing the E stage. Therefore, the arithmetic operation by the arithmetic logic unit 11 is performed. In the prior art, the microinstruction is output to the MI-bus 10 and source data are output to the A-bus 13 and B-bus 14 in accordance with the microinstruction. Then the arithmetic operation by the arithmetic and logic unit 11 is performed using the microinstruction and the source data. Compared to the prior art, the necessary time for the E stage in this embodiment can be remarkably reduced. As a result, the execution time of other stages consisting IF stage, A stage and OF stage can also be reduced, thereby further reducing overall instruction processing time.

The write operation of the arithmetic operation result by the arithmetic and logic unit 11 in the GR 5 is same as in the prior art.

However, the write operation of the arithmetic operation result by the arithmetic and logic unit 11 in the WR 16 is different from that of the prior art. That is, in this embodiment the write operation of the arithmetic operation result by the arithmetic and logic unit 11 in the WR 16 is performed by the contents of the D field of the microinstruction in the register 25 given to the WR 16 as the b address. At the E stage for the instruction I1, the contents of the data on the MI-bus 10 is changed to the microinstruction used at the E stage for the instruction I2. Therefore, by the time to start the E stage for the instruction I1, the contents of the D field of the microinstruction output onto the MI-bus 10 are stored in the register 25 at the OF stage for the instruction I1.

As is apparent from the above description, in this embodiment the microinstruction and the source data used at the E stage being executed are stored in the registers 22 through 25. And during the E stage, or during the OF stage for the next instruction, a microinstruction and source data used at the E stage for the next instruction are output onto the MI-bus 10 (within the data bus 12), A-bus 13 and the B-bus 14.

In the embodiment described above, the contents of all fields of the instruction has been sequentially transferred into the registers 1 through 3. However only the field used at each stage may be selected to be transferred to the registers 1 through 3.

Further, the GR 5 is accessed during the A stage by the register address, for instance R1, loaded in the instruction register 1. However, the GR 5 may be acessed during the OF stage by the register address R1 of the instruction loaded in the instruction register 2. In this case, the same type of output gate as the G 21 should be used in place of the registers 6 and 7. Further, during the OF stage the data read out from the GR 5 should be output onto the A-bus 13 and the B-bus 14 by the decoded signal of the microinstruction on the MI-bus 10.

Further, in the embodiment described above, the pipeline processing consists of the IF stage, the A stage, the OF stage and the E stage. However, the number of the stages is not limited to four. For example, the A stage may be divided into a logical address generation stage and a physical address generation stage. That is, it may be constructed such that at the OF stage the microinstruction and the source data used at the succeeding E stage are output onto the MI-bus and the data bus. And by the time execution of the E stage starts, the microinstruction and the source data are stored in the registers 22, 23 and 24.

What is claimed is:

1. An arithmetic control apparatus for a pipeline processing system having
    an instruction fetch stage, an operand address computation stage, an operand fetch stage, and an instruction execution stage, said arithmetic control apparatus comprising:
    first instruction register means for storing an instruction at an end of said instruction fetch stage, for outputting said instruction during said operand address computation stage, and for transferring said instruction at an end of said operand address computation stage;
    second instruction register means, coupled to said first instruction register means, for storing said instruction at said end of said operand address computation stage, and for transferring said instruction at an end of said operand fetch stage;
    third instruction register means, coupled to said second instruction register means, for storing said instruction at said end of said operand fetch stage;
    means, coupled to said first instruction register means, for storing microinstructions, and for outputting, during said operand fetch stage, a microinstruction corresponding to said instruction;
    means, coupled to said microinstruction storing and outputting means, for storing data, and for outputting therefrom fetched operands during said operand fetch stage in accordance with said microinstruction, said third instruction register means also for outputting a portion of said instruction to said data storing and fetched operands outputting means; and
    arithmetic and logic means, coupled to said microinstruction storing and outputting means and said data storing and fetched operands outputting means, for storing at an end of said operand fetch stage said fetched operands output by said data storing and fetched operands outputting means, for performing, during said instruction execution stage, an arithmetic operation upon said fetched operands in accordance with said microinstruction, and for outputting at an end of said instruction execution stage a result of said arithmetic operation to said data storing and fetched operands outputting means.

2. An apparatus as in claim 1 wherein said data storing and fetched operands outputting means is coupled to said arithmetic and logic means by a first data bus and a second data bus.

3. An apparatus as in claim 2 wherein said data storing and fetched operands outputting means comprises
    group register means, coupled to said first and third instruction register means, for storing said data, and for outputting therefrom, during said operand address computation stage, at least one operand in accordance with said instruction; and
    first register means, coupled to said group register means, said microinstruction storing and outputting means, and said first and second data busses, for storing at an end of said operand address computation stage said at least one operand output by said group register means, and for outputting to said first and second data busses said at least one operand during said operand fetch stage in accordance with said microinstruction; and, wherein, in accordance with said microinstruction, said first data bus receives a first of said fetched operands during said operand fetch stage, and said second data bus receives a second of said fetched operands during said operand fetch stage.

4. An apparatus as in claim 3 wherein said data storing and fetched operands outputting means further comprises:
    main memory means for storing said data, and for outputting therefrom, during said operand fetch stage, a main memory operand corresponding to an address computed during said operand address computation stage; and
    main memory register means, coupled to said main memory means, said microinstruction storing and outputting means, and said second data bus, for loading with, during said operand fetch stage, said main memory operand, and for outputting said main memory operand, during said operand fetch stage, in accordance with said microinstruction.

5. An apparatus as in claim 4 wherein said data storing and fetched operands outputting means further comprises:
    working register means, coupled to said microinstruction storing and outputting means, said first data bus, and said second data bus, for storing said data, and for outputting therefrom operands onto said first and second data busses, during said operand fetch stage, in accordance with said microinstruction.

6. An apparatus as in claim 5 wherein said microinstruction storing and outputting means comprises
    control storage means, coupled to said first instruction register means, for storing said microinstructions and for outputting, during said operand address computation stage, said microinstruction corresponding to said instruction; and
    microinstruction register means, coupled to said control storage means, said first register means, said working register means, said main memory register means, and said arithmetic and logic means, for storing at said end of said operand address computation stage said microinstruction, and for outputting said microinstruction during said operand fetch stage.

7. An apparatus as in claim 6 wherein said arithmetic and logic means comprises:
   second register means, coupled to said second data bus, for storing, at an end of said operand fetch stage,
   said second of said fetched operands received from said second data bus, and for outputting said second of said fetched operands during said instruction execution stage;
   third register means, coupled to said first data bus, for storing at said end of said operand fetch stage,
   said first of said fetched operands received from said first data bus, and for outputting said first of said fetched operands during said instruction execution stage;
   fourth register means, coupled to said microinstruction register means, for storing, at said end of said operation fetch stage, said microinstruction, and for outputting said microinstruction during said instruction execution stage; and
   means, coupled to said second, third and fourth register means, for performing, during said instruction execution stage, said arithmetic operation upon said first and second of said fetched operands in accordance with said microinstruction, and for outputting said result to said data storing and fetched operands outputting means.

8. An apparatus as in claim 7 further comprising
   destination register means, coupled to said microinstruction register means, and said working register means, for storing, at said end of said operand fetch stage, an address designated by said microinstruction; and,
   wherein said working register means receives said result from said arithmetic operation performing and result outputting means, and stores said result at said address designated by said microinstruction.

9. An arithmetic control apparatus for a pipeline processing system having an instruction fetch stage, an operand address computation stage, an operand fetch stage, and an instruction execution stage, comprising:
   main memory means for storing instructions and a first set of data, for outputting, during said instruction fetch stage, an instruction, and for outputting from said first set of data, during said operand fetch stage, a main memory operand corresponding to an address computed during said operand address computation stage;
   instruction register means, coupled to said main memory means, for storing and outputting instructions in accordance with said stages of said pipeline processing system;
   a first data bus;
   a second data bus;
   means, coupled to said instruction register means, for storing microinstructions, and for outputting, during said operand fetch stage, a microinstruction corresponding to said instruction output by said main memory means during said instruction fetch stage;
   main memory register means, coupled to said main memory, said microinstruction storing and outputting means and said second data bus, for loading with, during said operand fetch stage, said main memory operand, and for outputting said main memory operand during said operand fetch stage in accordance with said microinstruction;
   group register means, coupled to said instruction register means, for storing a second set of data and for outputting therefrom, during said operand address computation stage, at least one operand in accordance with said instruction output by said main memory means during said instruction fetch stage;
   first register means, coupled to said group register means, said microinstruction storing and outputting means, and said first and second data busses, for storing at an end of said operand address computation stage said at least one operand output by said group register means, and for outputting to said first and second data busses said at least one operand during said operand fetch stage in accordance with said microinstruction,
   said first data bus receiving a first fetched operand during said operand fetch stage in accordance with said microinstruction, and said second data operand fetch stage in accordance with said microinstruction;
   second register means, coupled to said second data bus, for storing, at an end of said operand fetch stage,
   said second fetched operand received from said second data bus, and for outputting said second fetched operand during said instruction execution stage;
   third register means, coupled to said first data bus, for storing at said end of said operand fetch stage,
   said first fetched operand received from said first data bus, and for outputting said first fetched operand during said instruction execution stage;
   fourth register means, coupled to said microinstruction storing and outputting means, for storing, at said end of said operation fetch stage, said microinstruction, and for outputting said microinstruction during said instruction execution stage; and
   means, coupled to said second, third and fourth register means, for performing, during said instruction execution stage, an arithmetic operation upon said first and second fetched operands in accordance with said microinstruction, and for outputting a result of said operation.

* * * * *